United States Patent [19]
Edgar

[11] Patent Number: 6,160,111
[45] Date of Patent: *Dec. 12, 2000

[54] PROCESS FOR PREPARING CELLULOSE ESTERS USING A SULFONIC ACID RESIN CATALYST

[75] Inventor: Kevin J. Edgar, Kingsport, Tenn.

[73] Assignee: Eastman Chemical Company, Kingsport, Tenn.

[*] Notice: This patent issued on a continued prosecution application filed under 37 CFR 1.53(d), and is subject to the twenty year patent term provisions of 35 U.S.C. 154(a)(2).

[21] Appl. No.: 08/758,977

[22] Filed: Dec. 2, 1996

Related U.S. Application Data

[63] Continuation of application No. 08/367,524, Dec. 30, 1994, abandoned.

[51] Int. Cl.[7] ............................... C08B 3/02; C08B 3/06; C08B 3/08; C08B 3/10
[52] U.S. Cl. ............................... 536/58; 536/63; 536/64; 536/65; 536/69; 536/124
[58] Field of Search ............................... 536/124, 63, 64, 536/65, 69, 58

[56] References Cited

U.S. PATENT DOCUMENTS

| | | |
|---|---|---|
| 1,880,808 | 10/1932 | Clarke et al. . |
| 2,366,007 | 12/1944 | D'Alelio ........................... 210/24 |
| 2,585,516 | 2/1952 | Thomas . |
| 2,705,710 | 4/1955 | Blume . |
| 2,861,069 | 11/1958 | Touey et al. . |
| 2,976,277 | 3/1961 | Touey et al. . |
| 2,992,214 | 7/1961 | Mench et al. . |
| 4,329,446 | 5/1982 | Wininger . |

OTHER PUBLICATIONS

Chemical Abstracts, Publication of the Chemical Abstracts Service, vol. 86, No. 8, Feb. 21, 1977, Abstr. No. 44988h. Derwent Publications Ltd., London, GB; (AN 91271X XP002003437) & JP A51119088 (Asahi Dow KK) Oct. 1976.

"Aliphatic Acid Esters of Cellulose" by C. J. Malm, et al., *Industrial & Engineering Chem.*, 43, 1951, 684–688.

"Cellulose Derivatives with low DS. I. A novel acylation system" by Gamini Samaranayake & Wolfgang G. Glasser, *Carbohydrate Polymers*, Aug. 22, 1993, 1–7.

"Aliphatic Acid Esters of Cellulose" by C. J. Malm, et al., *Industrial & Engineering Chem.*, 43, 1951, 684–691.

"Synthesis of Long Chain Fatty Acids Esterified onto Cellulose via the Vacuum–Acid Chloride Process" by Harpreet S. Kwatra, et al, *Industrial & Engineering Chem.*, 31, 1992, 2647–2651.

"The Synthesis of Ion Exchange Resins" by Kunin and Meyers, (John Wiley and Sons), 1950).

"Acid–Catalyzed Solvolysis of Cellulose Acetate Hydrogensulfate in Solution" by Klaus Garves, *Cellulose Chem. Technol.*, 13, 1979, 299–305.

"The Transacetoacetylation Reaction: Mechanistic Implications" by J. Stewart Witzeman, *Tetrahedron Letters*, vol.31, No. 10, 1990, 1401–1404.

"Synthesis and Characterization of Long–Chain Fatty Acid Cellulose Ester (FACE)" by Pinglang Wang and Bernard Y. Tao, *Journal of Applied Polymer Science*, vol. 52, May 1994, 755–761.

Glasser et al. Cellulose Derivatives with Low DS. I. A Novel Acylation System, Carbohydrate Polymers, Elsevier Science Publishers, p 1–7 (1993).

*Primary Examiner*—Jeffrey C. Mullis
*Attorney, Agent, or Firm*—Rose M. Allen; Harry J. Gwinnell

[57] ABSTRACT

The present invention relates to a process for preparing cellulose esters having a total DS/AGU of 0.1 to 3.0, said process comprising contacting the following:

(i) a cellulose material,
(ii) a solubilizing amount of a solvent system comprising a carboxamide diluent or a urea-based diluent,
(iii) an acylating reagent, and
(iv) an insoluble sulfonic acid resin catalyst.

59 Claims, No Drawings

6,160,111

PROCESS FOR PREPARING CELLULOSE ESTERS USING A SULFONIC ACID RESIN CATALYST

This application is a continuation of application Ser. No. 08/367,524, filed Dec. 30, 1994, abandoned.

FIELD OF THE INVENTION

This invention relates to a process for the preparation of esters of cellulose having a DS/AGU of between 0.1 and 3.0 where the cellulose or cellulose derivative is contacted with an acylating reagent, an insoluble sulfonic acid resin catalyst, and a carboxamide diluent or a urea-based diluent.

BACKGROUND OF THE INVENTION

Cellulose esters (CEs) are conventionally synthesized by the reaction of cellulose with the anhydride or anhydrides corresponding to the desired ester group or groups, using the corresponding carboxylic acid as diluent and product solvent.

In these processes, the reaction mixture is heterogeneous initially due to the insolubility of cellulose in most organic solvents including carboxylic acids. The reaction is terminated when the cellulose derivative has gone into solution and the desired solution viscosity has been reached. When the mixture becomes homogeneous, the cellulose is fully or almost fully acylated.

Optionally, one may use a large excess of sulfuric acid catalyst, in which case the product is a cellulose alkanoate sulfate. Selective cleavage of the sulfate groups can afford a partially substituted cellulose alkanoate. It is, however, extremely difficult to remove a large DS (degree of substitution) of sulfate esters without simultaneously reducing the DP (degree of polymerization) of the cellulose ester to unacceptable levels.

Thus, in conventional processes, the synthesis of partially substituted cellulose esters is accomplished by hydrolysis of cellulose triesters, prepared by mineral acid catalyzed acylation in a separate step, to the desired level of substitution. Typically, hydrolysis in a mixture of water and carboxylic acid solvent results in scrambling of position of substitution (due to acyl migration and simultaneous, but slower, reesterification of the newly exposed hydroxyl groups by the carboxylic acid solvent) so that the products have an equilibrium distribution of ester substituents.

Partially substituted cellulose esters have great commercial value. They are used in coatings, where their greater solubility (in comparison with triesters) and hydroxyl group content (to facilitate crosslinking) are prized. In plastics, fibers, and film applications, the ability to synthesize partially substituted CEs permits control over thermal, mechanical, biodegradation, and compatibility properties.

It is well known in the art that esters of cellulose with long-chain carboxylic acids could be prepared by acylation with the corresponding acid chlorides in pyridine or, less successfully, other solvents. This method was useful only for synthesis of cellulose triesters. For example, see Malm, et al., *Ind. Eng. Chem.,* 1951, 43, 684–688.

U.S. Pat. No. 2,705,710 discloses DMAC as a solvent and sulfuric acid as a catalyst to make cellulose triacetate (a fully substituted ester—2.9 DS Ac and 0.10 DS sulfate). The reaction disclosed in this patent is run at 140° C. and, therefore, is very fast. The disadvantage of the sulfuric acid technology of U.S. Pat. No. 2,705,710 is the need for a hydrolysis step in order to obtain partially substituted cellulose esters.

Direct synthesis of partially substituted CEs has also been taught previously by acylation of cellulose in solution as shown in U.S. Pat. No. 2,976,277. If cellulose is first dissolved in a mixture of lithium chloride and an amide solvent (either 1-methyl-2-pyrrolidinone (NMP) or N,N-dimethylacetamide (DMAC)), it can then be acylated with a carboxylic anhydride in the presence or absence of a catalyst to afford a partially or fully substituted CE depending only on the equivalents of anhydride added. Esters of cellulose with long-chain carboxylic acids have been made in this way. Thus, in *Carbohydrate Polymers,* 22, 1–7, 1993, it is disclosed that it is possible to react cellulose in DMAC/LiCl solution with a variety of carboxylic acid chlorides using amine catalysis, or alternatively carboxylic acids using dicyclohexylcarbodiimide catalysis, to obtain esters of cellulose with acids of chain length up to 18 carbons (stearate) and DS 0.1 to 2.5. While this method has great flexibility in terms of the nature of the anhydride and the DS of the product obtained, the necessity for dissolving cellulose means that reaction mixtures must be dilute (no more than 5% cellulose) and that the process is lengthened by the time it takes for cellulose dissolution. It is a practical necessity to develop a method to recycle the expensive lithium chloride with high efficiency, which method has not yet been disclosed.

Long-chain (carbon chain length greater than 4) esters of cellulose (LCCEs) are known from the pioneering work of Malm as shown in *Ind. Eng. Chem.,* 43, 684–691, 1951. Efforts to obtain LCCEs by reaction of cellulose with long-chain anhydrides in carboxylic acid solvent with mineral acid catalysis have not been successful because the esterification rate is too slow and cannot compete with the rate of chain cleavage.

The only other methods known in the literature involve the use of "impeller" reagents such as chloroacetic anhydride, as disclosed in U.S. Pat. No. 1,880,808, and the reaction of regenerated cellulose with long-chain acid chlorides in pyridine or, as disclosed in *Ind. Eng. Chem. Res.,* 31, 2647–2651, 1991, neat. The impeller reagents tend to be expensive, toxic, and difficult to handle.

Regenerated cellulose is expensive, as are acid chlorides, which also require reactors of corrosion-resistant construction. Additionally, direct reaction of cellulose with acid chlorides under vacuum does not result in homogeneous, soluble products.

LCCEs are of interest commercially because of their lower processing temperatures, greater impact strength, greater solubility in less polar solvents, the likelihood of greater compatibility with hydrophobic polymers, the potential for formation into molded or extruded objects without the need for a plasticizer, and their potential utility as associative thickeners for water-based paints (by analogy with long-chain ethers of cellulose, such as hydrophobically-modified hydroxyethylcellulose).

It has been also disclosed in U.S. Pat. No. 2,705,710 that activation of cellulose with N,N-dialkylamides prior to conventional (mineral acid and carboxylic anhydride) esterification permits rapid esterification without excessive degradation. The patent also discloses that this is a process for making cellulose triacetate with inherent viscosity in the range of 1.1 to 1.3 (less than that required for many current commercial applications).

In U.S. Pat. No. 2,861,069, it is disclosed that sulfonated polystyrene resins are effective catalysts for acylation of cellulose by carboxylic anhydrides in the corresponding carboxylic acid solvent. Disadvantages of the method include: (1) that a large excess of anhydride is required to prevent undesirable chain degradation, and (2) that only fully substituted esters may be prepared in this way unless a separate hydrolysis step is included.

Clearly, a need exists in the art for a process by which CEs of less than full substitution can be prepared directly from cellulose. The process must be economical, practical, and amenable to industrial production. It should be possible with this process to synthesize products which have sufficiently high molecular weight for their particular commercial application. It would be desirable to be able to use long-chain anhydrides in this process, such that cellulose esters containing long-chain ester groups could be obtained. It is essential that the products be sufficiently homogeneous so that they can be processed thermally and/or in solution, to be useful for film, coatings, plastics, and certain other applications. It is desirable to use a catalyst which could be physically separated from the product by simple techniques such as filtration and which could, therefore, easily be recovered for re-use. It is also desirable to have the ability to control product DS and molecular weight by practical and predictable adjustments to process conditions.

SUMMARY OF THE INVENTION

This invention relates to preparation of cellulose esters (CEs) of degree of substitution (DS) less than or equal to 3.0 by reaction of cellulose in a carboxamide diluent or a urea-based diluent (optionally containing an additional cosolvent), with a acylating reagent such as carboxylic acid anhydride, using an insoluble sulfonic acid resin catalyst.

More particularly, this invention relates to a process for preparing cellulose esters having a total DS/AGU of 0.1 to 3.0, said process comprising of contacting the following:

(i) a cellulose material,
(ii) a solubilizing amount of a solvent system comprising either a carboxamide diluent or a urea-based diluent, wherein the carboxamide portion of said carboxamide diluent comprises the structure:
$R^4R^5NCOCR^6R^7R^8$, wherein $R^4$, $R^5$, $R^6$, $R^7$, and $R^8$ are independently selected from the group consisting of hydrogen, alkyl having from about 1 to about 20 carbon atoms, branched alkyl having from about 1 to about 20 carbon atoms, phenyl, naphthyl, alkenyl having from about 1 to about 20 carbon atoms, and branched alkenyl having from about 1 to about 20 carbon atoms, and wherein said urea portion of said urea-based diluent comprises the structure:
$R^9R^{10}NCONR^{11}R^{12}$, wherein $R^9$, $R^{10}$, $R^{11}$, and $R^{12}$ are independently selected from the group consisting of hydrogen, alkyl having from about 1 to about 20 carbon atoms, branched alkyl having from about 1 to about 20 carbon atoms, phenyl, naphthyl, alkenyl having from about 1 to about 20 carbon atoms, and branched alkenyl having from about 1 to about 20 carbon atoms,
(iii) an acylating reagent selected from the group consisting of
(a) an acid chloride, and optionally, an acid acceptor,
(b) a carboxylic acid anhydride,
(c) diketene, ketene, 2,2,6-trimethyl-4H-1,3-dioxin-4-one, and an ester of acetoacetic acid,
(d) an ester of a carboxylic acid, and combinations of one or more of (a)–(d), and
(iv) an insoluble sulfonic acid resin catalyst; wherein said components (i) and (ii) are contacted first and components (iii) and (iv) are contacted with the product of said contacting of components (i) and (ii), in anal order.

Preferably, the invention relates to a process for making esters of cellulose with long-chain carboxylic acids (containing more than 4 carbon atoms).

The advantages of this process over the prior art include: being able to use cellulose with a lower alpha content and a lower molecular weight, synthesis of partially or fully substituted esters of cellulose with long-chain carboxylic acids and, optionally, short-chain acids, and the ability to obtain partially substituted cellulose esters. These partially substituted cellulose esters have good solubility in a wide range of organism solvents and can have high molecular weight. For the purposes of this invention, long-chain shall refer to greater than 4 carbons, while short-chain shall refer to 4 carbons or less.

The process of the invention has broad utility for the economical, direct synthesis of cellulose esters for plastics, film, fiber, and coatings applications.

DETAILED DESCRIPTION OF THE INVENTION

As used herein, the term "degree of substitution" or "DS" or "DS/AGU" refers to the average number of acyl substituents per anyhydroglucose ring of the cellulose polymer.

The present invention relates to a process for preparing a cellulose ester having a total DS/AGU of 0.1 to 3.0, preferably 2.0 to 3.0, more preferably 2.4 to 2.9, said process comprising contacting the following:

(i) a cellulose material,
(ii) a solubilizing amount of a solvent system comprising either a carboxamide diluent or a urea-based diluent,
(iii) an acylating reagent selected from the group consisting of
(a) an acid chloride, and optionally, an acid acceptor,
(b) a carboxylic acid anhydride,
(c) diketene, ketene, 2,2,6-trimethyl-4H-1,3-dioxin-4-one, and an ester of acetoacetic acid,
(d) an ester of a carboxylic acid, and combinations one or more of (a)–(d), and (iv) an insoluble sulfonic acid resin catalyst.

Components (i) and (ii) are usually contacted first and components (iii) and (iv) are contacted with the product of said contacting of components (i) and (ii), in any order.

The cellulose esters produced by the invention generally comprise the following structure:

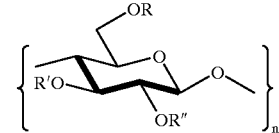

wherein R, R', and R" are selected separately from the group consisting of: hydrogen, with the proviso that R, R', and R" are not all hydrogen simultaneously; acetoacetyl; and $R^1C=O$ wherein $R^1$ is alkyl having from about 1 to about 30 carbons; carboxyalkyl of the structure $(CH_2)_mCO_2H$, where m is from 2 to 6, preferably from 2 to 4; carboxyalkenyl of the structure, $CR^2=CR^3CO_2H$, where $R^2$ and $R^3$ are independently selected from the group consisting of hydrogen, methyl, branched alkyl having from about 1 to about 30 carbons, phenyl, and naphthyl; alkenyl having from about 1 to about 30 carbon atoms and from one to three double bonds; and branched alkenyl having from about 1 to about 30 carbon atoms and having from one to three double bonds.

For carboxyalkenyl, alkenyl and branched alkenyl, the double bonds present may be in the cis or trans position.

It is preferred that R, R' and R" are independently selected from the group consisting of hydrogen, acetyl, propionyl and butyryl for the cellulose ester structure indicated above. The long-chain esters are also preferred.

The carboxamide portion of the carboxamide diluent comprises the structure: $R^4R^5NCOCR^6R^7R^8$, wherein $R^4$, $R^5$, $R^6$, $R^7$, and $R^8$ are independently selected from the group consisting of hydrogen, alkyl having from about 1 to about 20 carbon atoms, branched alkyl having from about 1 to about 20 carbon atoms, substituted phenyl, phenyl, substituted naphthyl, naphthyl, alkenyl having from about 1 to about 20 carbon atoms, and branched alkenyl having from about 1 to about 20 carbon atoms.

Examples of the carboxamide diluents are 1-methyl-2-pyrrolidinone (NMP), N,N-dimethylpropionamide, N,N-diethylacetamide, or N,N-dimethylacetamide (DMAC). DMAC is particularly preferred.

Carboxamides such as succinimides, phthalimides or glutarimides may also be used as diluents.

The urea portion of the urea-based diluent comprises the structure: $R^9R^{10}NCONR^{11}R^{12}$, wherein $R^9$, $R^{10}$, $R^{10}$, and $R^{12}$ are independently selected from the group consisting of hydrogen, alkyl having from about 1 to about 20 carbon atoms, branched alkyl having from about 1 to about 20 carbon atoms, phenyl, naphthyl, alkenyl having from about 1 to about 20 carbon atoms, and branched alkenyl having from about 1 to about 20 carbon. atoms.

Urea compounds useful in the diluents of this invention also intended within the scope of the general, definition are ones wherein one of $R^9$ and $R^{10}$ and one of $R^{11}$ and $R^{12}$ are connected to form a cyclic urea, such as N,N-dimethylimidazolidinone. Preferred urea compounds are ones selected from the group consisting of urea and N,N-dimethylimidazolidinone. N,N-dimethylimidazolidinone has the structure:

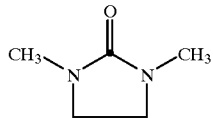

Amino acids such as proline or glycine may also be used as diluents.

The ratios of solvent to cellulose used can vary within a moderately wide range.

For the purposes of this invention, examples of alkyl having from about 1 to about 20 carbon atoms are methyl, ethyl, propyl, butyl, hexyl, nonyl, hexadecyl, and alkyl including aryl substituted alkyl such as benzyl, cycloalkyl such as cyclohexyl, etc. Examples of branched alkyl having from about 1 to about 20 carbon atoms are isopropyl, isobutyl, isononyl, tertiary butyl, etc. Examples of alkenyl are propenyl, decenyl, pentadecenyl, (Z)-heptadec-8-enyl, and (Z,Z)-heptadecadi-8,11-enyl. Examples of branched alkenyl are pentadecenyl.

Other activated acyl derivatives such as acid chlorides, are also useful; in the case of acid chlorides an acid acceptor such as pyridine, sodium bicarbonate, or sodium acetate may optionally be used as well. The acylating reagents may also include diketene, 2,2,6-trimethyl-4H-1,3-dioxin-4-one (TKD), or an ester of acetoacetic acid. As taught by Witzeman in Tetrahedron Letters, 1990, 31, 1401–1404, tert-butyl acetoacetate (tBAA) is an especially suitable aceto-acetate ester because it generates the reactive intermediate, acetylketene, at a high rate.

Preferred acid chlorides are acetyl chloride, propionyl chloride, butyryl chloride, hexanoyl chloride, lauroyl chloride, palmitoyl chloride, and stearoyl chloride. In the case of acid chlorides, an acid acceptor such as pyridine, sodium bicarbonate, or sodium acetate may optionally be used in combination with the acylating reagent.

Preferred in this invention are carboxylic anhydrides selected from the group consisting of acetic anhydride, propionic anhydride, butyric anhydride, hexanoic anhydride, nonanoic anhydride, lauric anhydride, palmitic anhydride, and stearic anhydride.

Preferred acylating reagents in this invention are esters of carboxylic acids which are selected from the group consisting of the following acids: capric, lauric, palmitic, stearic, oleic, linoleic, linolenic, cyclohexanedicarboxylic, benzoic, substituted benzoic, phthalic, isophthalic and terephthalic.

Acid acceptors useful within the context of this invention are selected from the group consisting of pyridine, triethylamine, sodium bicarbonate and sodium acetate. The term "acid acceptor" is generally meant refer to a basic material, such as a Lewis base. Pyridine is a preferred acid acceptor.

Preferred cellulose esters made by the process of this invention include cellulose acetate, cellulose butyrate, cellulose propionate, cellulose acetate butyrate, cellulose acetate propionate, cellulose acetate hexanoate, cellulose acetate nonanoate, cellulose acetate laurate, cellulose palmitate, cellulose acetate stearate, cellulose nonanoate, cellulose hexanoate, cellulose hexanoate propionate, and cellulose nonanoate propionate.

A wide variety of sources of cellulose may be used for the practice of this invention. Cellulose sources useful in our invention include hardwoods, softwoods, cotton linters, bacterial cellulose, and regenerated cellulose.

The practice of the current invention allows for a wide variety of cellulose starting materials, temperatures, concentrations, insoluble sulfonic acid resin catalysts, carboxylic acid anhydrides, nonsolvents, and reactant ratios. A wide variety of cellulose esters may be produced, depending on the conditions selected.

Temperatures employed for all aspects of the process of the invention are in the range of about 0° C. to about 200° C., preferably about 100° C. to about 180° C., and more preferably, about 120° C. to about 170° C.

The insoluble sulfonic acid resin catalysts are easily separated from the reaction mixture by methods known in the art, such as filtration and can therefore be repeatedly re-used.

The products are isolated by methods known in the art, for example by adding a nonsolvent (often water) to the reaction mixture after separation of the catalyst, and isolating the precipitated product by filtration and washing.

In this invention, a combination of carboxamide or urea with an insoluble sulfonic acid resin catalyst is employed wherein the carboxamide or urea functions as wan activating agent, diluent, and a solvent.

In the process of the invention, the molar ratio of component (iii):component (iv) is that amount that will result in the desired DS/AGU under the chosen reaction conditions. Conditions suitable for the formation of cellulose esters can vary widely. The cellulose must first be activated by contacting with the amide-based diluent or urea-based diluent. This may be most simply accomplished by heating a slurry of the cellulose in the amide-based diluent or urea-based diluent to a temperature of 100–180° C., although it is also possible to accomplish the activation by prolonged contact at room temperature.

The acylating reagent(s) is typically added all at once. The total amounts of acylating reagents used can vary from 3 to 10 equivalents based on equivalents of anhydroglucose units, with 4 to 6 equivalents most preferred. Within this total the proportion of each acylating reagent may be varied to achieve the desired DS of each substituent in the product.

It is preferable that the amount of cellulose material present is about 1.0 percent to about 50 percent, preferably about 9.0 percent to about 28 percent, based on the weight of said carboxamide-based diluent or urea-based diluent, and the amount of said insoluble sulfonic acid resin catalyst is about 0.1 percent to about 100 percent, preferably about 5.0 percent to about 50 percent, based on the weight of said cellulose material.

The process of this invention usually includes the additional step of insolubilizing the cellulose ester by addition of an insolubilizing amount of a nonsolvent. It may also include the step of separating the insolubilized cellulose ester.

Nonsolvents referred as being useful for the isolation of cellulose esters manufactured by this process will be specific to the particular material. They should dissolve the reaction solvents and any by-products, but should be nonsolvents for the cellulose ester. Examples include methanol, ethanol, 2-propanol, and water.

The insoluble polymeric type sulfonic acids which are preferred as catalysts in the manufacture of the esters of cellulose of the invention are those which are ordinarily known as sulfonic acid type ion exchange resins. They contain the active sulfonic acid radicals chemically bound to a cross linked polymeric structure. Normally they are of one of the following two types:

I. Polyvinyl aryl compounds and monovinyl aryl compounds such as sulfonated copolymers of styrene and divinyl benzene, for example, Amberlyst XN-1010 commercially available from Rohm & Haas and Dowex 50-X20-200 commercially available from Dow Chemical Company.

II. Sulfonated condensation polymers of phenol and formaldehyde.

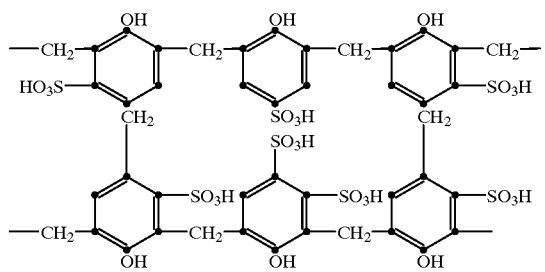

Sulfonic acid type ion exchange resins can be described as high molecular weight poly acids which are insoluble in aqueous and nonaqueous media. They comprise an insoluble cross-linked back-bone polymer structure to which are fixed sulfonic acid groups which present hydrogen ions. The number of sulfonic acid groups present in the ion exchange resin determine its effectiveness as a catalyst along with the size of the insoluble resin. Although these two factors can vary over a relatively wide range and the resin will still exhibit catalytic properties the more are those described in U.S. Pat. No. 2,366,007 of D'Alelio and the sulfonic acid ion exchange resins described in chapter 5 of the book entitled "Ion Exchange Resins" by Kunin and Meyers (John Wiley and Sons, 1950).

The products of the process of this invention are useful for various purposes such as for plastics, film, fiber, and coatings applications.

DS or DS/AGU can be determined for the cellulose esters of this invention by any method known in the art, for example, by proton NMR.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise described. All percentages are by weight unless otherwise described.

EXAMPLES

In the following examples, the cellulose and carboxamide or urea-based solvent were added to a three-neck round bottom flask equipped with mechanical stirrer, thermometer, nitrogen inlet, and distillation head. The slurry was heated to 100° C. under nitrogen, with stirring. Then the anhydride(s) and the catalyst (Amberlyst XN-1010, 1 part by weight per 4 parts by weight cellulose) were added to the activated cellulose, and the mixture was heated to reaction temperature. Note that "equiv" below refers to equivalents of reagent per anhydroglucose unit of cellulose. In each example, the mixture was stirred at the reaction temperature until it was clear and smooth, except for the presence of the polymeric catalyst. The solution then was cooled to 20–80° C. The catalyst was removed by filtration (sometimes the reaction mixture was diluted with acetone or the amide or urea diluent first to reduce viscosity). The product was precipitated by adding the filtrate dropwise to water or methanol in water with strong agitation. The product was isolated by filtration, then was slurried again in water or in methanol in water. This process was repeated two to five times as required to remove all impurities from the product. The product was dried in a vacuum oven under nitrogen at 40–80° C. The yields quoted in the examples are of isolated, well-characterized products. DS was determined by $^1$H NMR in d-6 DMSO containing several drops of trifluoroacetic acid (to shift any hydroxyl protons downfield), or by hydrolysis of a sample of the cellulose ester followed by quantification of liberated carboxylic acids by gas chromatography. Gel permeation chromatography used NMP as solvent (polystyrene reference). Intrinsic viscosity was measured in phenol/tetrachloroethane (60/40) solution. Differential scanning calorimetry (20° C./min, second scan, maximum temperature 240° C.) was employed to determine $T_g$'s. Sulfur content was measured by X-ray fluorescence. Representative members of each family of materials were examined by infrared spectroscopy to confirm product identity. All temperatures in degrees centigrade.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise indicated.

EXAMPLE 1

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX-hardwood pulp, available from International Paper in Natchez, Mississippi |
| Carboxylic Anhydride | Acetic anhydride |
| Equiv | 6 |
| Reaction Temperature | 120° C. |
| Amide Diluent | DMAC |
| g Amide/g Cellulose | 10 |
| Reaction Time | 5.3 hours |
| Key Analyses | DS (acetyl) = 2.88, IV = 2.48, GPC $M_n$ = 125,000, soluble in DMSO and NMP, sulfur content = 224 ppm. |

This example demonstrates direct synthesis from cellulose of a partially substituted, high molecular weight cellulose acetate with good solubility in organic solvents.

EXAMPLE 2

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX |
| Carboxylic Anhydride | Propionic anhydride |
| Equiv | 6 |
| Reaction Temperature | 150° C. |
| Amide Diluent | DMAC |
| g Amide/g Cellulose | 10 |
| Reaction Time | 1.6 hours |
| Key Analyses | DS (propionyl) = 2.58, IV = 1.42, GPC $M_n$ = 52,300, $T_g$ = 101° C., soluble in DMSO and NMP, sulfur content = 285 ppm. |

This example demonstrates synthesis of an amorphous, relatively high molecular weight, partially substituted cellulose propionate with good solubility in organic solvents, directly from cellulose.

EXAMPLE 3

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX |
| Carboxylic Anhydride | Propionic anhydride |
| Equiv | 4.22 |
| Reaction Temperature | 135° C. |
| Amide Diluent | DMAC |
| g Amide/g Cellulose | 5 |
| Reaction Time | 4.4 hours |
| Key Analyses | DS (propionyl) = 2.67, IV = 0.82, GPC $M_n$ = 36,500, $T_g$ = 127° C., $T_m$ = 233° C., soluble in DMSO and NMP. |

This example demonstrates control over molecular weight by manipulating the amount of anhydride, the potential for using only slight excess of anhydride, the capability to synthesize partially crystalline cellulose propionate, and that smaller amounts of amide diluent may be used.

EXAMPLE 4

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX |
| Carboxylic Anhydride | Acetic anhydride |
| Equiv | 3.97 |
| Carboxylic Acid | Acetic Acid |
| grams per gram cellulose | 15.7 |
| Reaction Temperature | 118° C. |
| Amide Diluent | None |
| g Amide/g Cellulose | 0 |
| Reaction Time | 0.5 hours |
| Key Analyses | DS (acetyl) = 3.02, IV = 0.26, GPC $M_n$ = 18,000, soluble in DMSO and NMP, sulfur content = 117 ppm. |

This example demonstrates that in the absence of amide diluent a cellulose acetate product of low molecular weight and full substitution is obtained, which has very limited solubility in organic solvents.

EXAMPLE 5

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX |
| Carboxylic Anhydride | Propionic anhydride |
| Equiv | 4.22 |
| Carboxylic Acid | Propionic Acid |
| grams per gram cellulose | 9.93 |
| Reaction Temperature | 100° C. |
| Amide Diluent | None |
| g Amide/g Cellulose | 0 |
| Reaction Time | 3.1 hours |
| Key Analyses | DS (propionyl) = 3.04, IV = 0.16, GPC $M_n$ = 5,900, $T_g$ = 76° C., $T_m$ = 206° C., soluble in acetone, acetic acid, THF, DMSO and NMP. |

This example demonstrates that in the absence of amide diluent a cellulose propionate product of low molecular weight and full substitution is obtained.

EXAMPLE 6

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX |
| Carboxylic Anhydride | Propionic anhydride |
| Equiv | 6.00 |
| Reaction Temperature | 150° C. |
| Amide Diluent | NMP |
| g Amide/g Cellulose | 10.33 |
| Reaction Time | 8.6 hours |
| Key Analyses | DS (propionyl) = 3.09, IV = 0.80, GPC $M_n$ = 43,500, $T_g$ = 109° C., $T_m$ = 237° C., soluble in acetone, acetic acid, TMF, chloroform, DMSO and NMP. |

This example demonstrates that with NMP diluent a crystalline, highly soluble cellulose propionate product. of moderate molecular weight and full substitution is obtained.

EXAMPLE 7

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX |
| Carboxylic Anhydride | Propionic anhydride |
| Equiv | 4.00 |
| Acetoacetylating Reagent | Diketene |
| Equiv | 1.0 |
| Reaction Temperature | 120° C. |
| Amide Diluent | DMAC |
| g Amide/g Cellulose | 9.37 |
| Reaction Time | 11.9 hours |
| Key Analyses | DS (propionyl) = 2.54, DS (acetoacetyl) = 0.79 (high total DS may be due to some enol propionate), IV = 1.22, GPC $M_n$ = 44,400, $T_g$ = 122° C., soluble in THF, acetic acid, acetone, $CHCl_3$, DMSO and NMP. |

This example demonstrates that it is possible to synthesize a mixed ester containing acetoacetyl groups by using amide diluent.

EXAMPLE 8

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX |
| Carboxylic Anhydride 1 | Acetic anhydride |
| Equiv | 2.0 |
| Carboxylic Anhydride 2 | Hexanoic anhydride |
| Equiv | 2.0 |
| Reaction Temperature | 150° C. |
| Amide Diluent | DMAC |
| g Amide/g Cellulose | 9.37 |
| Reaction Time | 2.6 hours |
| Key Analyses | DS (acetyl) = 1.70, DS (hexanoyl) = 0.80, IV = 1.18, GPC $M_n$ = 45,100, soluble in acetone, acetic acid, THF, $CHCl_3$, DMSO and NMP, $T_g$ = 91° C., $T_m$ = 196° C. |

This example demonstrates direct synthesis from cellulose of a partially substituted, mixed cellulose ester, where one of the ester groups is a long-chain ester, with good solubility in organic solvents.

EXAMPLE 9

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX |
| Carboxylic Anhydride 1 | Acetic anhydride |
| Equiv | 2.0 |
| Carboxylic Anhydride 2 | Lauric anhydride |
| Equiv | 2.0 |
| Reaction Temperature | 160° C. |
| Amide Diluent | DMAC |
| g Amide/g Cellulose | 9.37 |
| Reaction Time | 1.1 hours |
| Key Analyses | DS (acetyl) = 1.95, DS (lauroyl) = 0.61, IV = 1.03, GPC $M_n$ = 39,900, soluble in acetone, THF, $CHCl_3$, and NMP, $T_g$ = 104° C., $T_m$ = 215° C. |

This example demonstrates direct synthesis from cellulose of a partially substituted, mixed cellulose ester, where one of the ester groups is a long-chain ester, with good solubility in organic solvents.

The invention has been described in detail with particular reference to preferred embodiments thereof, but it will be understood that variations and modifications can be effected within the spirit and scope of the invention. Moreover, all patents, patent applications (published and unpublished, foreign or domestic), literature references or other publications noted above are incorporated herein by reference for any disclosure pertinent to the practice of this invention.

We claim:

1. A process for preparing cellulose esters having a total DS/AGU of 0.1 to 2.9, said process comprising contacting the following:
   (i) a cellulose material,
   (ii) a solubilizing amount of a solvent system for said resultant cellulose esters comprising either a carboxamide diluent or a urea-based diluent,
      wherein the carboxamide portion of said carboxamide diluent comprises the structure: $R^4R^5NCOCR^6R^7R^8$, wherein $R^4$, $R^5$, $R^6$, $R^7$, and $R^8$ are independently selected from the group consisting of hydrogen, alkyl having from about 1 to about 20 carbon atoms, branched alkyl having from about 1 to about 20 carbon atoms, phenyl, naphthyl, alkenyl having from about 1 to about 20 carbon atoms, and branched alkenyl having from about 1 to about 20 carbon atoms, and wherein said urea portion of said urea-based diluent comprises the structure: $R^9R^{10}NCONR^{11}R^{12}$, wherein $R^9$, $R^{10}$, $R^{11}$, and $R^{12}$ are independently selected from the group consisting of hydrogen, alkyl having from about 1 to about 20 carbon atoms, branched alkyl having from about 1 to about 20 carbon atoms, phenyl, naphthyl, alkenyl having from about 1 to about 20 carbon atoms, and branched alkenyl having from about 1 to about 20 carbon atoms, (iii) an acylating reagent selected from the group consisting of
(a) an acid chloride, and optionally, an acid acceptor,
(b) a carboxylic acid anhydride,
(c) diketene, ketene, 2,2,6-trimethyl-4H-1,3-dioxin-4-one, and an ester of acetoacetic acid,
(d) an ester of a carboxylic acid, and combinations of one or more of (a)–(d), and (iv) an insoluble sulfonic acid resin catalyst;

wherein said components (i) and (ii) are contacted first and components (iii) and (iv) are contacted with the product of said contacting of components (i) and (ii), in any order, wherein after the contacting step, the resultant cellulose ester has a DS/AGU of from 0.1 to 2.9.

2. A process for preparing cellulose esters having a total DS/AGU of 0.1 to 2.9, said process comprising contacting the following:

(i) a cellulose material, (ii) a solubilizing amount of a solvent system for said resultant cellulose esters comprising a carboxamide diluent, wherein the carboxamide of said carboxarnide diluent has the structure: $R^4R^5NCOCR^6R^7R^8$, wherein $R^4$, $R^5$, $R^6$, $R^7$, and $R^8$ are independently selected from the group consisting of hydrogen, alkyl having from about 1 to about 20 carbon atoms, branched alkyl having from about 1 to about 20 carbon atoms, phenyl, naphthyl, alkenyl having from about 1 to about 20 carbon atoms, and branched alkenyl having frcom about 1 to about 20 carbon atoms, (iii) an acylating reagent selected from the group consisting of
(a) an acid chloride, and optionally, an acid acceptor,
(b) a carboxylic acid anhydride,
(c) diketene, ketene, 2,2,6-trimethyl-4H-1,3-dioxin-4-one, an ester of acetoacetic acid,
(d) an ester of a carboxylic acid, and combinations of one or more of (a)–(d), and (iv) an insoluble sulfonic acid resin catalyst;

wherein said components (i) and (ii) are contacted first and components (iii) and (iv) are contacted with the product of said contacting of components (i) and (ii) in any order, wherein after the contacting step, the resultant cellulose ester has a DS/AGU of from 0.1 to 2.9.

3. The process of claim 1, wherein the cellulose ester is not subjected to a hydrolysis step.

4. A process for preparing cellulose esters having a total DS/AGU of 0.1 to less than 3.0, said process comprising contacting the following:

(i) a cellulose material, (ii) a solubilizing amount of a solvent system for said resultant cellulose esters comprising a carboxamide diluent, wherein the carboxamide of said carboxamide diluent has the structure: $R^4R^5NCOCR^6R^7R^8$, wherein R4, $R^5$, $R^6$, $R^7$, and $R^8$ are independently selected from the group consisting of hydrogen, alkyl having from about 1 to about 20 carbon atoms, branched alkyl having from about 1 to about 20 carbon atoms, phenyl, naphthyl, alkenyl having from about 1 to about 20 carbon atoms, and branched alkenyl having from about 1 to about 20 carbon atoms, (iii) an acylating reagent selected from the group consisting of
(a) an acid chloride, and optionally, an acid acceptor,
(b) a carboxylic acid anhydride,
(c) diketene, ketene, 2,2,6-trimethyl-4H-1,3-dioxin-4-one, an ester of acetoacetic acid,
(d) an ester of a carboxylic acid, and combinations of one or more of (a)–(d), and (iv) an insoluble sulfonic acid resin catalyst;

wherein said components (i) and (ii) are contacted first and components (iii) and (iv) are contacted with the product of said contacting of components (i) and (ii) in any order.

5. The process of claim 4 wherein said cellulose esters comprise the structure:

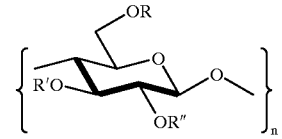

wherein R, R', and R" are selected separately from the group consisting of: hydrogen, with the proviso that R, R', and R" are not all hydrogen simultaneously; acetoacetyl; and $R^1C=O$ wherein $R^1$ is selected from the group consisting of: alkyl having from about 1 to about 30 carbons; carboxyalkyl of the structure, $(CH_2)_mCO_2H$, where m is from 2 to 6; carboxyalkenyl of the structure $CR^2=CR^3CO_2H$, where $R^2$ and $R^3$ are independently selected from the group consisting of hydrogen, methyl, branched alkyl having from about 1 to about 30 carbons, phenyl, and naphthyl; alkenyl having from about 1 to about 30 carbon atoms and from one to three double bonds; and. branched alkenyl having from about 1 to about 30 carbon atoms and having from one to three double bonds.

6. The process of claim 5 wherein said m of said carboxyalkyl is from 2 to 4.

7. The process of claim 5 where in R, R', and R" are independently selected from hydrogen, acetyl, propionyl and butyryl.

8. The process of claim 4 wherein the amount of cellulose material is about 1.0 percent to about 50 percent, based on the weight of said carboxamide, and the amount of said insoluble sulfonic acid resin catalyst is about 0.1 percent to about 100 percent, based on the weight of said cellulose material.

9. The process of claim 4 wherein the amount of cellulose material is about 9 percent to about 28 percent, based on the weight of said carboxamide, and the amount of said insoluble sulfonic acid resin catalyst is about 5.0 percent to about 50 percent, based on the weight of said cellulose material.

10. The process of claim 4 wherein the total DS/AGU of the cellulose ester is about 2.0 to about 3.0.

11. The process of claim 4 wherein the total DS/AGU of the cellulose ester is about 2.4 to about 2.9.

12. The process of claim 4 wherein said carboxamide diluent is selected from the group consisting of 1-methyl-2-pyrrolidinone, N,N-dimethylpropionamide, N,N-diethylacetamide and N,N-dimethylacetamide.

13. The process of claim 4 wherein said carboxamides are selected from the group consisting of succinimides, phthalimides and glutarimides.

14. The process of claim 4 wherein said ester of acetoacetic acid is tert-butyl acetoacetate.

15. The process of claim 4 wherein said carboxylic anhydride is selected from the group consisting of acetic anhydride, propionic anhydride, butyric anhydride, hexanoic anhydride, nonanoic anhydride, lauric anhydride, palmitic anhydride, and stearic anhydride.

16. The process of claim 4 wherein said acid chloride is selected from the group consisting of acetyl chloride, propionyl chloride, butyryl chloride, hexanoyl chloride, lauroyl chloride, and stearoyl chloride.

17. The process of claim 4 wherein said acid acceptor is selected from the group consisting of pyridine, triethylamine, sodium bicarbonate and sodium acetate.

18. The process of claim 4 wherein said acid acceptor is pyridine.

19. The process of claim 4 wherein said insoluble sulfonic acid resin catalyst is a sulfonated polymer of a mixture comprising a polyvinyl aryl compound and a monovinyl aryl compound.

20. The process of claim 4 wherein said insoluble sulfonic acid resin catalyst is a sulfonated copolymer of styrene and divinyl benzene.

21. The process of claim 4 wherein said insoluble sulfonic acid resin catalyst is a sulfonated condensation polymer of a phenol and an aldehyde.

22. The process of claim 4 wherein said insoluble sulfonic acid resin catalyst is a sulfonated condensation polymer of phenol and formaldehyde.

23. The process of claim 4 wherein said cellulose material is selected from the group consisting of hardwood pulp, softwood pulp, cotton linters, bacterial cellulose, and regenerated cellulose.

24. The process of claim 4 carried out at a temperature between about 0° C. and about 200° C.

25. The process of claim 4 carried out at a temperature between about 100° C. and about 180° C.

26. The process of claim 4 comprising the additional step of separating the insoluble sulfonic acid resin catalyst by filtration for recovery and re-use.

27. The process of claim 4 including the additional step of insolubilizing the cellulose ester by addition of an insolubilizing amount of a nonsolvent.

28. The process of claim 27 further comprising separating the insolubilized cellulose ester.

29. The process of claim 27 wherein said nonsolvent is methanol, ethanol, propanol, water, or a mixture thereof.

30. A process for preparing cellulose esters having a total DS/AGU of 0.1 to 3.0, said process comprising contacting the following:
   (i) a cellulose material,
   (ii) a solubilizing amount of a solvent system for said resultant cellulose esters comprising a urea-based diluent, wherein said urea-based compound of said urea-based diluent has the structure: $R^9R^{10}NCONR^{11}R^{12}$, wherein $R^9$, $R^{10}$, $R^{11}$, and $R^{12}$ are independently selected from the group consisting of hydrogen, alkyl having from about 1 to about 20 carbon atoms, branched alkyl having from about 1 to about 20 carbon atoms, phenyl, naphthyl, alkenyl having from about 1 to about 20 carbon atoms, and branched alkenyl having from about 1 to about 20 carbon atoms, (iii) an acylating reagent selected from the group consisting of
      (a) an acid chloride, and optionally, an acid acceptor,
      (b) a carboxylic acid anhydride,
      (c) diketene, ketene, 2,2,6-trimethyl-4H-1,3,dioxin-4one, and an ester of acetoacetic acid,
      (d) an ester of a carboxylic acid, and combinations of one or more of (a)–(d), and
   (iv) an insoluble sulfonic acid resin catalyst;
wherein said components (i) and (ii) are contacted first, and components (iii) and (iv) are contacted with the product: of said contacting of components (i) and (ii), in any order.

31. The process of claim 2, wherein the cellulose ester is not subjected to a hydrolysis step.

32. The process of claim 30, wherein the cellulose ester is not subjected to a hydrolysis step.

33. The process of claim 30 wherein said esters of carboxylic acids are esters formed from an acid selected from the group consisting of capric acid, lauric acid, palmitic acid, stearic acid, oleic acid, lineolic acid, lineolenic acid, cyclohexanedicarboxylic acid, benzoic acid, substituted benzoic acid, phthalic acid, isophthalic acid and terephthalic acid.

34. The process of claim 30 wherein said cellulose esters comprise the structure:

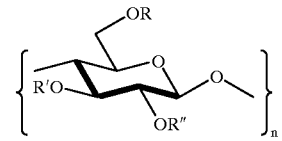

wherein R, R', and R" are selected separately from the group consisting of: hydrogen, with the proviso that R. R', and R" are not all hydrogen simultaneously; acetoacetyl; and $R^1C=O$ wherein $R^1$ is alkyl having from about 1 to about 30 carbons; carboxyalkyl of the structure $(CH_2)_mCO_2H$, where m is from about 2 to 6; carboxyalkenyl of the structure $CR^2=CR^3CO_2H$, where $R^2$ and $R^3$ are independently selected from the group consisting of hydrogen or methyl, branched alkyl having from about 1 to about 30 carbons, phenyl, and naphthyl; alkenyl having from about 1 to about 30 carbon atoms and having from one to three double bonds; and branched alkenyl having from about 1 to about 30 carbon atoms and having from one to three double bonds.

35. The process of claim 34 wherein said m of said carboxyalkyl is from 2 to 4.

36. The process of claim 34 wherein R, R', and R" are independently selected from hydrogen, acetyl, propionyl and butyryl.

37. The process of claim 34 wherein the amount of cellulose material is about 1.0 percent to about 50 percent, based on the weight of said urea-based compound, and the amount of said insoluble sulfonic acid catalyst is about 0.1 percent to about 100 percent, based on the weight of said cellulose material.

38. The process of claim 37 wherein the amount of cellulose material is about 9 percent to about 28 percent, based on the weight of said urea-based compound, and the amount of said insoluble sulfonic acid resin catalyst is about 5.0 percent to about 50 percent, based on the weight of said cellulose material.

39. The process of claim 34 wherein said urea-based compound is selected from the group consisting of urea and N,N-dimethylimidazolidinone.

40. The process of claim 30 wherein the total DS/AGU of the cellulose ester is about 2.0 to about 3.0.

41. The process of claim 40 wherein the total DS/AGU of the cellulose ester is about 2.4 to about 2.9.

42. The process of claim 30 wherein said ester of acetoacetic acid is tert-butyl acetoacetate.

43. The process of claim 30 wherein said carboxylic anhydride is selected from the group consisting of acetic anhydride, propionic anhydride, butyric anhydride, hexanoic anhydride, nonanoic, lauric, palmitic, and stearic.

44. The process of claim 30 wherein said acid chloride is selected from the group consisting of acetyl chloride, propionyl chloride, butyryl chloride, hexanoyl chloride, lauroyl chloride, and stearoyl chloride.

45. The process of claim 30 wherein said acid acceptor is selected from the group consisting of pyridine, triethylamine, sodium bicarbonate and sodium acetate.

46. The process of claim 30 wherein said insoluble sulfonic acid resin catalyst is a sulfonated copolymer of styrene and divinyl benzene.

47. The process of claim 30 wherein said insoluble sulfonic acid resin catalyst is a sulfonated polymer of a mixture comprising a polyvinyl aryl compound and a monovinyl aryl compound.

48. The process of claim 30 wherein said insoluble sulfonic acid resin catalyst is a sulfonated condensation polymer of phenol and an aldehyde.

49. The process of claim 48 wherein said insoluble sulfonic acid resin catalyst is a sulfonated condensation polymer of a phenol and formaldehyde.

50. The process of claim 30 wherein said cellulose material is selected from the group consisting of hardwood pulp, softwood pulp, cotton linters, bacterial cellulose, and regenerated cellulose.

51. The process of claim 30 carried out at a temperature between about 0° C. and about 200° C.

52. The process of claim 30 carried out at a temperature between about 100° C. and about 180° C.

53. The process of claim 30 comprising the additional step of separating the sulfonic acid catalyst by filtration for recovery and re-use.

54. The process of claim 30 wherein said acid acceptor is pyridine.

55. The process of claim 30 including the additional step of insolubilizing the cellulose ester by addition of an insolubilizing amount of a nonsolvent.

56. The process of claim 55 further comprising separating the insolubilized cellulose ester.

57. The process of claim 55 wherein said nonsolvent is methanol, ethanol, propanol, water, or a mixture thereof.

58. The process of claims 1, 2, or 30, wherein after said contacting, the resultant esterified cellulose is a partially esterified cellulose having a total DS/ALGU of less than 3.0 and the partially esterified cellulose is not hydrolysed during said contacting or in a subsequent step.

59. The process of claim 30 wherein one of $R^9$ and $R^{10}$ and one of $R^{11}$ and $R^{12}$ are connected to form a cyclic urea.

* * * * *

UNITED STATES PATENT AND TRADEMARK OFFICE
CERTIFICATE OF CORRECTION

PATENT NO. : 6,160,111
DATED : December 12, 2000
INVENTOR(S) : Kevin J. Edgar

It is certified that error appears in the above-identified patent and that said Letters Patent is hereby corrected as shown below:

Column 13,
Line 41, delete the term "carboxarnide" and insert therefor -- carboxamide --.

Column 14,
Lines 1-30, delete "claim 4" in its entirety.
Line 52, delete the term "claim 4" and insert therefor -- claim 2 --.
Line 52, delete "and." and insert therefor -- and --.
Lines 60 and 66, delete the term "claim 4" and insert therefor -- claim 2 --.

Column 15,
Lines 5, 7, 9, 13 and 16, delete the term "claim 4" and insert therefor -- claim 2 --.
Lines 18, 23, 26 and 29, delete the term "claim 4" and insert therefor -- claim 2 --.
Lines 31, 35, 38, 40 and 43, delete the term "claim 4" and insert therefor -- claim 2 --.
Lines 47 and 49, delete the term "claim 4" and insert therefor -- claim 2 --
Lines 48 and 50, delete the term "C." and insert therefor -- C --.
Lines 51 and 54, delete the term "claim 4" and insert therefor -- claim 2 --.

Column 16,
Line 15, delete the term "4one" and insert therefor -- 4-one --.
Line 18, delete the comma after phrase "contacted first."
Line 20, delete the colon after the word "product."
Line 44, delete "R." and insert therefor -- R, --.

UNITED STATES PATENT AND TRADEMARK OFFICE
CERTIFICATE OF CORRECTION

PATENT NO. : 6,160,111
DATED : December 12, 2000
INVENTOR(S) : Kevin J. Edgar

It is certified that error appears in the above-identified patent and that said Letters Patent is hereby corrected as shown below:

Column 18,
Lines 12 and 14, delete the term "C." and insert therefor -- C --.
Line 28, delete the term "DS/ALGU" and insert therefor -- DS/AGU --.

Signed and Sealed this

First Day of April, 2003

JAMES E. ROGAN
*Director of the United States Patent and Trademark Office*